US012780173B2

(12) United States Patent
Han et al.

(10) Patent No.: US 12,780,173 B2
(45) Date of Patent: Nov. 3, 2026

(54) VEHICLE CONTROL APPARATUS AND METHOD THEREOF

(71) Applicants: Hyundai Motor Company, Seoul (KR); Kia Corporation, Seoul (KR)

(72) Inventors: Kug Hun Han, Hwaseong-si (KR); Ji Su Kim, Hwaseong-Si (KR); Yu Jin Shim, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 74 days.

(21) Appl. No.: 19/052,141

(22) Filed: Feb. 12, 2025

(65) Prior Publication Data

US 2026/0014975 A1 Jan. 15, 2026

(30) Foreign Application Priority Data

Jul. 10, 2024 (KR) ........................ 10-2024-0091245

(51) Int. Cl.

*B60W 10/00* (2006.01)
*B60N 2/56* (2006.01)
*B60W 10/30* (2006.01)

(52) U.S. Cl.

CPC .......... *B60W 10/30* (2013.01); *B60N 2/5621* (2013.01); *B60W 2510/244* (2013.01); *B60W 2710/30* (2013.01)

(58) Field of Classification Search

CPC .......... B60W 10/30; B60W 2510/244; B60W 2710/30; B60N 2/5621; B60N 2/5657; B60N 2/5685; B60N 2/5678; B60N 2/0278; B60L 1/003; B60L 1/02; B60L 58/18; B60L 2240/662

See application file for complete search history.

(56) References Cited

U.S. PATENT DOCUMENTS

2025/0368103 A1* 12/2025 Harkleroad .......... B60N 2/5642

* cited by examiner

*Primary Examiner* — Ian Jen
(74) *Attorney, Agent, or Firm* — Banner & Witcoff, Ltd.

(57) ABSTRACT

A vehicle control apparatus and a method thereof are provided. The vehicle control apparatus includes a memory storing a program instruction in conjunction with a seat of a vehicle, which includes at least one of a heating wire or a ventilation motor, or any combination, and a processor that executes the program instruction. The processor identifies whether a seat operation mode for operating the at least one of the heating wire or the ventilation motor, or the any combination thereof in a state in which the vehicle ignition is off is activated and operates the at least one of the heating wire or the ventilation motor, or the any combination thereof, based on that the seat operation mode is activated.

20 Claims, 6 Drawing Sheets

VEHICLE CONTROL APPARATUS AND METHOD THEREOF

CROSS-REFERENCE TO RELATED APPLICATION

This application claims the benefit of priority to Korean Patent Application No. 10-2024-0091245, filed in the Korean Intellectual Property Office on Jul. 10, 2024, the entire contents of which are incorporated herein by reference.

TECHNICAL FIELD

The present disclosure relates to a vehicle control apparatus and a method thereof, and more particularly, relates to technologies for controlling a heating wire of a seat and/or a ventilation motor of the seat.

BACKGROUND

Many vehicles feature heating seats or many ventilation seats. A heating seat may be a seat that increases its temperature by means of one or more electric wires embedded in the seat. Due to this, a user may sit on the warm seat.

A ventilation seat be a seat that circulates air on the surface of the seat by means of a fan and an air path embedded in the seat. As the ventilation seat circulates the air on its surface, it may decrease a temperature of the seat. Due to this, the user may sit on a cool seat.

As various convenience functions have been loaded into the vehicle, there may be an increase in time spent in the vehicle by a user, sometimes with the ignition off. For example, if a high voltage battery loaded into an electric vehicle is being charged, the user may stay in the interior of the electric vehicle for a long time with the ignition off. At this time, there may be a need to operate a heating wire of the seat (e.g., if the indoor temperature of the vehicle is low), and/or there may be a need to operate a ventilation motor of the seat (e.g., if the indoor temperature of the vehicle is high).

However, if the heating wire of the seat or the ventilation motor of the seat uniformly and/or continuously operate in a state in which the vehicle ignition is off, unnecessary power consumption may be caused due to operation not intended by the user.

Thus, there is a need for a technology capable of operating the heating wire of the seat or the ventilation motor of the seat if a certain condition is met in the state in which the vehicle ignition is off.

The matters described in this Background section are only for enhancement of understanding of the background of the disclosure, and should not be taken as acknowledgement that they correspond to prior art already known to those skilled in the art.

SUMMARY

The following summary presents a simplified summary of certain features. The summary is not an extensive overview and is not intended to identify key or critical elements.

Systems, apparatuses, and methods are described for controlling a heating wire of a seat of a vehicle and/or a ventilation motor of the seat. A vehicle control apparatus may comprise: a memory storing one or more instructions associated with a seat, of a vehicle, comprising at least one of a heating wire or a ventilation motor; and a processor configured to execute the one or more instructions, wherein the processor is configured to: determine that a seat operation mode, for operating the at least one of the heating wire or the ventilation motor, is activated in a state in which an ignition of the vehicle is turned off; and operate, based on the seat operation mode being activated in the state in which the ignition is turned off, the at least one of the heating wire or the ventilation motor.

Also, or alternatively, a vehicle control method may comprise: identifying, by a processor of a vehicle, whether a seat operation mode, for operating at least one of a heating wire included in a seat of the vehicle or a ventilation motor included in the seat of the vehicle, is activated while an ignition of the vehicle is turned off; and operating, based on the seat operation mode being activated and by the processor, the at least one of the heating wire or the ventilation motor.

Also, or alternatively, a vehicle may comprise: a seat comprising at least one of a heating wire or a ventilation motor; a processor configured to control operation of the at least one of the heating wire or the ventilation motor; and a memory storing one or more instructions that, when executed, cause the processor to: determine that an ignition of the vehicle is off and that a seat operation mode, for operating the at least one of the heating wire or the ventilation motor, is activated; and operate, based on that the seat operation mode being activated, the at least one of the heating wire or the ventilation motor.

These and other features and advantages are described in greater detail below.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
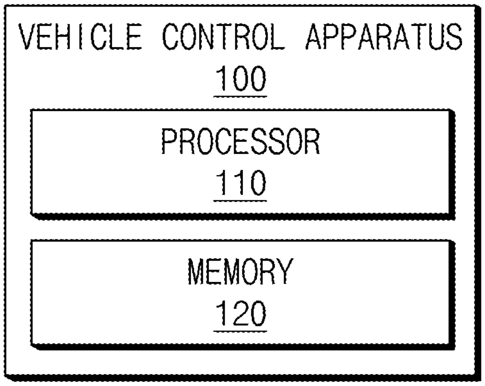
FIG. 1 is a block diagram illustrating a vehicle control apparatus according to an example of the present disclosure.

Hereinafter, some examples of the present disclosure will be described in detail with reference to the exemplary drawings. In adding the reference numerals to the components of each drawing, it should be noted that the identical component is designated by the identical numerals even when they are displayed on other drawings. In addition, a detailed description of well-known features or functions will be ruled out in order not to unnecessarily obscure the gist of the present disclosure.

The expressions such as “comprise”, “may comprise”, “include”, “may include”, “have”, “may have”, etc. as used herein are intended to mean the presence of a characteristic (e.g., function, operation, component, etc.) and do not exclude the presence of other additional characteristics. That is, these expressions should be understood as open-ended terms that encompass the possibility that other examples are included.

A singular expression used herein may include the meaning of the plural unless otherwise stated in the context, which also applies to the singular expression described in the claims.

In describing components of exemplary examples of the present disclosure, the terms first, second, A, B, (a), (b), and the like may be used herein. These terms are only used to distinguish one component from another component, but do not limit the corresponding components irrespective of the order or priority of the corresponding components. Particularly, the expression “at least one of A, B, or C, or any combination thereof” may include “A”, “B”, or “C”, or “AB”, “BC”, “AC”, or “ABC”, which is a combination thereof.

For purposes of this application and the claims, using the exemplary phrase “at least one of: A; B; or C” or “at least one of A, B, or C,” the phrase means “at least one A, or at least one B, or at least one C, or any combination of at least one A, at least one B, and at least one C. Further, exemplary phrases, such as “A, B, and C”, “A, B, or C”, “at least one of A, B, and C”, “at least one of A, B, or C”, etc. as used herein may mean each listed item or all possible combinations of the listed items. For example, “at least one of A or B” may refer to (1) at least one A; (2) at least one B; or (3) at least one A and at least one B.

Furthermore, unless otherwise defined, all terms including technical and scientific terms used herein have the same meaning as being generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Throughout the present disclosure, references to components, units, or modules generally refer to items that logically can be grouped together to perform a function or group of related functions. Like reference numerals are generally intended to refer to the same or similar components. Components, units, and modules may be implemented in software, hardware or a combination of software and hardware. The components, units, modules, and/or functions described above may be implemented and/or performed by one or more processors. For examples, the components, units, and/or modules may include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The components, units, and/or modules may also include software control module(s) implemented with a processor or logic circuitry for example. The components, units, and/or modules may include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware. One or more storage type media may include any or all of the tangible memory of computers, processors, or the like, or associated modules thereof, such as various semiconductor memories, tape drives, disk drives and the like, which may provide non-transitory storage at any time for software programming.

The expression “based on” as used herein is intended to describe one or more factors that influence an act or operation of determining or deciding described in a phrase or sentence including that expression, and this expression does not exclude any additional factors that influence the act or operation of determining or deciding.

When it is described that a component (e.g., a first component) is “connected” or “coupled” to another component (e.g., a second component) as used herein, it may mean that the component is not only directly connected or coupled to another component, but also connected or coupled through yet another component (e.g., a third component).

Depending on the context, the expression “configured to” as used herein may have meanings such as “set to”, “with the ability to”, “modified to”, “made to”, “to be able to”, etc. This expression is not limited to the meaning of “specially designed in hardware to”. For example, a processor configured to perform a specific operation may refer to a generic purpose processor capable of performing the specific operation by executing software, or to a special purpose computer structured through programming to perform the specific operation.

Hereinafter, examples of the present disclosure will be described in detail with reference to FIGS. 1 to 6.

FIG. 1 is a block diagram illustrating a vehicle control apparatus according to an example of the present disclosure.

Referring to FIG. 1, a vehicle control apparatus 100 according to an example of the present disclosure may be implemented in a vehicle. The vehicle control apparatus 100 may be integrally configured with control units in the vehicle and/or may be implemented as a separate device to be connected (e.g., communicatively and/or electronically) with the control units of the vehicle.

The vehicle control apparatus 100 may include a processor 110 and a memory 120. The components of the vehicle control apparatus 100, which are shown in FIG. 1, are illustrative, and examples of the present disclosure are not limited thereto. For example, the vehicle control apparatus 100 may further include components which are not shown in FIG. 1.

According to an example, the memory 120 may store instructions (e.g., commands and/or programs) and/or data. For example, the memory 120 may store one or more instructions that, when executed by the processor 110, cause the vehicle control apparatus 100 to perform various operations described herein.

For example, the memory 120 may store instructions configured to operate and/or control a seat, of the vehicle, which includes at least one of a heating wire or a ventilation motor, or any combination thereof.

According to an example, the memory 120 may be implemented with the processor 110 as one chipset and/or may store various pieces of information associated with the vehicle control apparatus 100. For example, the memory 120 may store information about an operation history of the processor 110.

According to an example, the memory 120 may include a non-volatile memory (e.g., a read only memory (ROM)) and a volatile memory (e.g., a random access memory (RAM)). For example, a pressure measured by a pressure sensor, a temperature measured by a temperature sensor, and/or data about a seat operation mode and/or a state of the seat comprising the heating wire and/or the ventilation motor (e.g., an operation mode and/or state in which the vehicle ignition is off) may be stored in the memory 120.

According to an example, the state of the vehicle may include an ignition-on state (e.g., in which the ignition is on and vehicle is able to travel), an accessory (ACC) state (e.g., in which only a minimal convenience device(s) are powered on), an ignition (IGN) state indicating a level to which various control units or accessories are powered on for the vehicle while the ignition is on (e.g., IGN1-IGN3 as discussed below), or an ignition-off state in which the vehicle is unable to travel.

According to an example, the state in which the vehicle is ignition-on may include a state in which the engine operates as the crankshaft of the vehicle rotates. Also, or alternatively, the state in which the vehicle is ignition-on may include a state in which an electric motor, which generates a driving force of the vehicle, operates/runs.

According to an example, the IGN state may include a state of IGN 1, a state of IGN 2, or a state of IGN 3. The state of IGN 1 may include a state in which all control units of the vehicle are turned on and a state in which a starter motor of the vehicle is turned on. The state of IGN 2 may include a state in which at least one accessory device (e.g., at least one of an air conditioner, a heater, the heating wire of the seat, the ventilation motor of the seat, or other devices that consumes much/substantial power) is powered on. The state of IGN 3 may include a state in which only a control unit associated with charging is powered on for an electric vehicle (EV) or a plug-in hybrid electric vehicle (PHEV).

According to an example, whether the vehicle ignition is on may be determined by means of the IGN state. Also, or alternatively, whether the vehicle ignition is on may be determined by whether the engine and/or the motor is running/operating.

According to an example, the state of IGN 3 may be determined based on various signals. For example, whether it is the state of IGN 3 may be determined based on a signal in which the vehicle is remotely controlled, a signal for executing and/or indicating execution of an interior space use function for operating the heating wire or the ventilation motor in the vehicle is executed, a signal indicating a first battery (or a high voltage battery) associated with electric power of the vehicle is charged and/or is being charged, a signal indicating a second battery (e.g., a 12V battery) associated with the heating wire or the ventilation motor is charged and/or is being charged, a signal for executing and/or indicating execution of a vehicle to load (V2L) function is executed, or the like.

The above-mentioned contents/configuration for IGN 1, IGN 2, or IGN 3 are only an example, and an order or a function in which the IGN state switches may be differently defined.

According to an example, the processor 110 may identify whether the seat operation mode for operating at least one of the heating wire and/or the ventilation motor, or any combination thereof, in the state in which the vehicle ignition is off is activated. The heating wire may refer to a heating wire included in the seat of the vehicle and may make the seat of the vehicle warm by means of heat emitted from the heating wire. The ventilation motor may refer to a ventilation motor included in the seat of the vehicle and may make the seat of the vehicle cool by operating to produce wind. The heating wire and/or the ventilation motor may be independently controlled. For example, both the heating wire and the ventilation motor may operate at the same time.

According to an example, the heating wire and/or the ventilation motor may operate in the state in which the vehicle ignition is on. The heating wire or the ventilation motor may operate based on manipulation of a user (e.g., input from the user via an interface of the vehicle and/or remote control interface associated with the vehicle) and/or a system (e.g., a control system of the vehicle, e.g., comprising the vehicle control apparatus 100) in the state in which the vehicle ignition is on.

According to an example, the seat operation mode may include a mode in which the heating wire or the ventilation motor operates even in the state in which the vehicle ignition is off. For example, if the vehicle ignition is off while the heating wire or the ventilation motor is operating, the operation of the heating wire or the ventilation motor may also be stopped. At this time, if the seat operation mode is activated, the heating wire or the ventilation motor may operate even in the state in which the vehicle ignition is off.

According to an example, the processor 110 may identify whether the seat operation mode is activated. For example, based on receiving an input for activating the seat operation mode, receiving a signal for activating the seat operation mode, and/or receiving information indicating a function for activating the seat operation mode is executed, the processor 110 may identify that the seat operation mode is activated.

According to an example, the processor 110 may activate the seat operation mode based on at least one of determining that the vehicle to load (V2L) function of the vehicle is operating, determining that the interior space use function determined that there is the user in the interior of the vehicle, or determining that one or more other functions of the vehicle, which indicate a need to operate the heating wire or the ventilation motor in the vehicle, is executed.

For example, the V2L function of the vehicle may include a function for using the battery of the vehicle as an external power source. Particularly, an electric vehicle (EV) may use a high voltage battery as an external power source by means of the V2L function. As a detailed example, the V2L function of the vehicle may be used to supply power to various electronic devices or may charge an external battery.

In other words, because the user is able to stay in the interior of the vehicle if the V2L function of the vehicle operates, there may be a need to operate the heating wire or the ventilation motor even in the state in which the vehicle ignition is off. Thus, if the V2L function operates in the state in which the vehicle ignition is off, the processor 110 may determine that there is a need to operate the heating wire or the ventilation motor, and may therefore activate the seat operation mode.

For example, the interior space use function may be executed and determine that there is a user in the interior of the vehicle. The interior use space function may include a function used if the user watches multimedia in the interior of the vehicle or a function executed if the user sleeps in the interior of the vehicle. As a detailed example, the user may watch a video by means of the display of the vehicle and/or may execute a sleep mode of the vehicle. The sleep mode of the vehicle may comprise, for example, reduction in the volume of a speaker may be reduced or a changing a seat position (e.g., reclining).

Execution of the interior space use function may indicate the user is sitting on the seat, so there may be a need to operate the heating wire or the ventilation motor even in the state in which the vehicle ignition is off if execution of the interior space use function is determined/detected. Thus, if the interior space use function operates, the processor 110 may determine that there is the need to operate the heating wire or the ventilation motor, thus activating the seat operation mode.

For example, one or more other functions of the vehicle, which may indicate a need to operate the heating wire or the ventilation motor in the vehicle, may include a function associated with an air conditioning device of the vehicle. As a detailed example, if the air conditioning device including an air conditioner or a heater operates, there may be a need to operate the heating wire or the ventilation motor to allow an indoor temperature of the vehicle to reach a temperature set by the user or the system.

In other words, if the one or more other functions of the vehicle, which may indicate a need to operate the heating wire or the ventilation motor in the vehicle operates, there may be a need to operate the heating wire or the ventilation motor even in the state in which the vehicle ignition is off to achieve the purpose of the function. Thus, if the one or more other functions of the vehicle, which may indicate a need to operate the heating wire or the ventilation motor in the vehicle, operates, the processor 110 may determine that there is the need to operate the heating wire or the ventilation motor, thus activating the seat operation mode.

According to an example, the processor 110 may operate at least one of the heating wire or the ventilation motor, or any combination thereof, based on that the seat operation mode is activated.

For example, if the processor 110 activates the seat operation mode, the user may operate the heating wire or the ventilation motor even in the state in which the vehicle ignition is off. In this case, the user may operate the heating wire and the ventilation motor at the same time.

For example, in activating the seat operation mode, the processor 110 may interwork with the system of the vehicle to operate the heating wire or the ventilation motor, even in the state in which the vehicle ignition is off.

According to an example, the processor 110 may activate the seat operation mode based on at least one of: a state in which the first battery associated with electric power of the vehicle is charged, a state in which the second battery associated with the heating wire or the ventilation motor is charged using the first battery, a state in which the vehicle receives a remote control command, a state in which the vehicle is being remotely controlled, or any combination thereof.

For example, if a specific precondition is met, the processor 110 may activate the seat operation mode. Herein, the specific precondition may include a condition corresponding to at least one of: the state in which the first battery associated with the electric power of the vehicle is charged, the state in which the second battery associated with the heating wire or the ventilation motor is charged using the first battery, the state in which the vehicle remotely receives the control command, or the state in which the vehicle is being remotely controlled.

According to an example, the first battery may include a battery associated with electric power of the vehicle. For example, the first battery may include a high voltage battery. As a detailed example, the first battery may include a battery which supplies power to an electric motor which provides a driving force of the vehicle.

According to an example, the second battery may include a battery associated with the heating wire or the ventilation motor of the vehicle. For example, the second battery may include a low voltage battery. The low voltage battery may include a 12V battery. As a detailed example, the second battery may include a battery for: operating the heating wire and/or the ventilation motor, operating the air conditioning device, operating a light of the vehicle, assisting the vehicle to be ignition on, and/or supplying power to an electronic system of the vehicle.

According to an example, the processor 110 may activate the seat operation mode in the state in which the first battery is charged. Because the first battery includes the high voltage battery, it may take a long time to charge the first battery. In this case, because the user is able to stay in the interior of the vehicle, there may be a need to operate the heating wire or the ventilation motor even in the state in which the vehicle ignition is off. Thus, if the first battery is charged in the state in which the vehicle ignition is off, the processor 110 may activate the seat operation mode.

According to an example, the processor 110 may activate the seat operation mode in the state in which the second battery associated with the heating wire or the ventilation motor is charged using the first battery. For example, the heating wire or the ventilation motor may operate with power of the second battery. If the heating wire or the ventilation motor operates in the state in which the vehicle ignition is off, there may be a risk that the second battery will be discharged. The processor 110 may charge (e.g., cause charging of) the second battery using the first battery. Thus, the processor 110 may activate the seat operation mode even in the state in which the second battery is charged (e.g., being charged) using the first battery.

According to an example, the processor 110 may activate the seat operation mode in the state in which the vehicle remotely receives the control command. For example, the user may remotely transmit the control command to the vehicle in the state in which the vehicle ignition is off. The processor 110 may activate the seat operation mode such that the heating wire or the ventilation motor is able to operate even if the vehicle remotely receives the control command in the state in which the vehicle ignition is off.

According to an example, the processor 110 may activate the seat operation mode in the state in which the vehicle is being remotely controlled. For example, the user may remotely control the vehicle in the state in which the vehicle ignition is off. At this time, there may be a need to remotely operate the heating wire or the ventilation motor. As a detailed example, the user may remotely control the heating wire or the ventilation motor to make the seat warm or may make the seat cool, in advance before he or she enters/rides in the vehicle. For another example, the user may remotely control the vehicle using a portable electronic device while staying in the interior of the vehicle in the state in which the vehicle ignition is off. Thus, if the vehicle is remotely controlled, the processor 110 may activate the seat operation mode.

If a state of charge (SOC) of the second battery meets an SOC condition for requiring charging, the second battery may be automatically charged (e.g., using the first battery). In this case, the second battery may be charged by receiving power from the first battery. The SOC condition for requiring the charging may include a case in which it is identified that the SOC of the battery meets a charging criteria (e.g., is less than or equal to a specific SOC).

According to an example, the processor 110 may fail to activate the seat operation mode (e.g., determine to deactivate or not to activate the seat operation mode), based on determining that the second battery is being charged (e.g., based on the SOC of the second battery associated with the heating wire or the ventilation motor meeting criteria for charging and/or the SOC condition for requiring the charging). If the second battery is configured to be automatically charged, the battery charging may not be performed by the user (e.g., by user input). In this case, if the vehicle ignition is off, because the user may not stay in the interior of the vehicle, there may be no need to operate the heating wire or the ventilation motor. Thus, in the state in which the vehicle ignition is off, if the second battery is charged automatically (e.g., as the SOC of the second battery meets the SOC condition for requiring the charging), the processor 110 may not activate the seat operation mode.

According to an example, the processor 110 may identify at least one of a speed at which the first battery associated with the electric power of the vehicle is charged or a time taken for the first battery to be fully charged, or any combination thereof, based on the seat operation mode being activated in the state in which the first battery is charged.

According to an example, the processor 110 may control the heating wire or the ventilation motor, based on the at least one of: the speed at which the first battery is charged and/or the time taken for the first battery to be fully charged, or the any combination thereof.

For example, the first battery may be charged at a low speed or a high speed, according to a charger or a charging scheme. If the first battery is charged at the high speed, it may be smoothly charged even as the heating wire or the ventilation motor operates (e.g., by the manipulation of the user or the system). On the other hand, if the heating wire or the ventilation motor operates while the first battery is charged at the low speed, the first battery may fail to be smoothly charged due to the operation of the heating wire or the ventilation motor.

If it is identified that the speed at which the first battery is charged is less than or equal to a threshold speed, the processor 110 may determine that the first battery is charged at the low speed. The threshold speed may include a charging speed determined that the first battery is charged at the low speed.

For example, whether the battery is charged at the low speed or is charged at the high speed may be determined according to a magnitude of power supplied by the charger. For example, if a power equal to or above a high threshold power, such as 50 kW or 100 KW is supplied from the charger to the battery, it may be determined that the battery is charged at the high speed. On the other hand, if a power less than or equal to the high threshold power, or a low threshold power, such as 7 kW or 3.3 kW, is supplied from the charger to the battery, it may be determined that the battery is charged at the low speed.

If the first battery is charged at the low speed, the processor 110 may control the heating wire or the ventilation motor to be different from an existing setting.

For example, if it is identified that the speed at which the first battery is charged is less than or equal to the threshold speed, the processor 110 may fail to (e.g., not, determine not to) operate the heating wire or the ventilation motor, may reduce a time over which the heating wire or the ventilation motor operates, or may reduce strength at which the heating wire or the ventilation motor operates.

As a detailed example, if there is a risk that the first battery will be discharged (e.g., while being charged at the low speed), the processor 110 may fail to operate the heating wire or the ventilation motor although the seat operation mode is activated.

For another example, if the first battery is charged at the low speed, the processor 110 may reduce a time over which the heating wire or the ventilation motor operates to maintain power of the first battery. As a detailed example, if the heating wire or the ventilation motor operates in the state in which the first battery is charged at the low speed, the processor 110 may automatically stop operating the heating wire or the ventilation motor if a certain time elapses.

For another example, if the first battery is charged at the low speed, the processor 110 may reduce strength at which the heating wire or the ventilation motor operates. As a detailed example, the processor 110 may reduce a temperature of the heating wire or may reduce a speed at which the ventilation motor rotates.

For another example, if the first battery is charged at the low speed, the processor 110 may limit a stage in which the heating wire operates or a stage in which the ventilation motor operates. As a detailed example, the heating wire or the ventilation motor may operate in a first stage, a second stage, or a third stage, and the intensity of the heating wire or the ventilation motor may increase as the stage goes from the first stage to the third stage. In this case, the processor 110 may control the heating wire and/or the ventilation motor to not operate in the third stage in the state in which the first battery is charged at the low speed.

If it is identified/determined that the time for the first battery to be fully charged is greater than or equal to the threshold time, the processor 110 may control the heating wire and/or the ventilation motor to operate differently from an existing setting.

For example, if it is identified that the time taken for the first battery to be fully charged is greater than or equal to the threshold time, the processor 110 may not operate the heating wire or the ventilation motor, may reduce a time over which the heating wire or the ventilation motor operates, and/or may reduce strength at which the heating wire or the ventilation motor operates.

As a detailed example, if determining that it is difficult for the first battery to be normally charged as it is identified that the time taken for the first battery to be fully charged is greater than or equal to the threshold time, the processor 110 may not operate the heating wire or the ventilation motor although the seat operation mode is activated.

For another example, if it is identified that the time taken for the first battery to be fully charged is greater than or equal to the threshold time, the processor 110 may reduce a time over which the heating wire or the ventilation motor operates to maintain power of the first battery. As a detailed example, if it is identified that the time taken for the first battery to be fully charged is greater than or equal to the threshold time, the processor 110 may automatically stop operating the heating wire or the ventilation motor if a certain time elapses.

For another example, if it is identified that the time for the first battery to be fully charged is greater than or equal to the threshold time, the processor 110 may reduce strength at which the heating wire or the ventilation motor operates. As a detailed example, the processor 110 may reduce a temperature of the heating wire or may reduce a speed at which the ventilation motor rotates.

For another example, if it is identified that the time taken for the first battery to be fully charged is greater than or equal to the threshold time, the processor 110 may limit a stage in which the heating wire operates or a stage in which the ventilation motor operates. For example, if it is identified that the time for the first battery to be fully charged is greater than or equal to the threshold time, the processor 110 may limit the heating wire or the ventilation motor to not operate in the third stage (e.g., operate in the first or second stages only).

If the processor 110 limits the operation of the heating wire or the ventilation motor based on the at least one of the speed at which the first battery is being charged or the time taken for the first battery to be fully charged, or the any combination thereof, the processor 110 may provide the user with (e.g., cause output of) a notification (e.g., by means of audio, video, navigation (AVN) of the vehicle. For example, if it is identified that the speed at which the first battery is charged is less than or equal to the threshold speed, the processor 110 may provide the user with a notification that the operation time of the heating wire or the ventilation motor is reduced.

According to an example, the processor 110 may identify environmental information including at least one of: an indoor temperature of the vehicle, an outdoor temperature of the vehicle, and/or weather of a place where the vehicle is located, or any combination thereof. For example, the processor 110 may identify the indoor temperature or the outdoor temperature via a temperature sensor of the vehicle. The processor 110 may receive weather information of the place where the vehicle is located (e.g., from an external server, the internet, etc.). The processor 110 may store environmental information including the indoor temperature of the vehicle, the outdoor temperature of the vehicle, or the weather of the place where the vehicle is located in the memory 120.

According to an example, the processor 110 may control the heating wire or the ventilation motor depending on the environmental information, based on that the seat operation mode being activated in the state in which it is identified that the speed at which the first battery is charged is less than or equal to the threshold speed.

For example, if the seat operation mode is activated in the state in which the first battery is being charged at the low speed and the indoor temperature of the vehicle (e.g., in the summer) is less than a predetermined temperature, the processor 110 may lower strength at which the ventilation motor operates.

For example, if the seat operation mode is activated in the state in which the first battery is being charged at the low speed and the indoor temperature of the vehicle (e.g., in the winter) is greater than the predetermined temperature, the processor 110 may reduce a strength at which the heating wire operates.

According to an example, the processor 110 may identify a position of a key of the vehicle. The key of the vehicle may include a key capable of remotely controlling the vehicle. The key of the vehicle may include a key, the position of which is able to be identified. As a detailed example, the key of the vehicle may include a key fob (e.g., comprising a radio-frequency identification (RFID)) and/or a digital key.

According to an example, the processor 110 may stop, based on the position of the key, operating (e.g., stop operation of) the heating wire or the ventilation motor based on that the seat operation mode being activated.

For example, the user may alight from the vehicle without turning off the heating wire or the ventilation motor, in the state in which the heating wire or the ventilation motor operates based on activation of in the seat operation mode. In this case, the processor 110 may stop operating (e.g., cause operation to stop for) the heating wire or the ventilation motor such that unnecessary power consumption does not occur. If the position of the key is away from the vehicle at a specific distance or more, the processor 110 may stop operating the heating wire or the ventilation motor.

Although the user alights from the vehicle while having the key of the vehicle, another user may remain in the interior of the vehicle. In this case, there is a need to provide the other user who remains in the vehicle with a notification that the operation of the heating wire or the ventilation motor is stopped. The other user who remains in the vehicle may check the notification and/or may operate the heating wire or the ventilation motor, the operation of which is stopped, again.

According to an example, the processor 110 may provide the notification that the operation of the heating wire or the ventilation motor is stopped. The notification may be output via at least one of a display of the vehicle or an audio output device of the vehicle, or any combination thereof, based on that the operation of the heating wire or the ventilation motor being stopped. For example, the processor 110 may provide the user with the notification that the operation of the heating wire or the ventilation motor is stopped, by means of the audio, video, navigation (AVN).

According to an example, the processor 110 may identify that a start state of the vehicle fluctuates (e.g., changes).

For example, if the vehicle ignition is on, the processor 110 may operate the heating wire or the ventilation motor, which is operating in the state in which the vehicle ignition is off, as it is. However, if it is determined that a load acting on the vehicle is large as the vehicle ignition is on, the processor 110 may temporarily stop operating the heating wire or the ventilation motor. For example, if the starter motor operates as the vehicle ignition is on, the processor 110 may temporarily stop the heating wire or the ventilation motor to reduce the load of the battery.

For example, if the vehicle ignition is off, the processor 110 may stop the heating wire or the ventilation motor from operating. If it is identified that the seat operation mode is activated, the processor 110 may continue operating the heating wire or the ventilation motor, although the vehicle ignition is off.

If the vehicle ignition is off, the processor 110 may be configured to temporarily stop the heating wire or the ventilation motor, even if the seat operation mode is activated. In this case, the processor 110 may operate the heating wire or the ventilation motor again depending on manipulation of the user. In other words, although determining that the seat operation mode is activated, the processor 110 may temporarily stop operating the heating wire or the ventilation motor and may operate the heating wire or the ventilation motor again depending on manipulation of and/or input from the user (e.g., to an interface of the vehicle and/or a remote control interface).

According to an example, the processor 110 may forcefully stop operating the heating wire or the ventilation motor, based on that the vehicle ignition is off, and may operate at least one of the heating wire or the ventilation motor, or any combination thereof again, based on that the seat operation mode is activated.

For example, if the vehicle ignition is off, in the state in which the heating wire or the ventilation motor operates, the processor 110 may forcefully stop operating the heating wire or the ventilation motor for now. The processor 110 may identify whether the seat operation mode is activated. If determining that the seat operation mode is activated, the processor 110 may operate at least one of the heating wire or the ventilation motor, or any combination thereof again.

Figure 2:
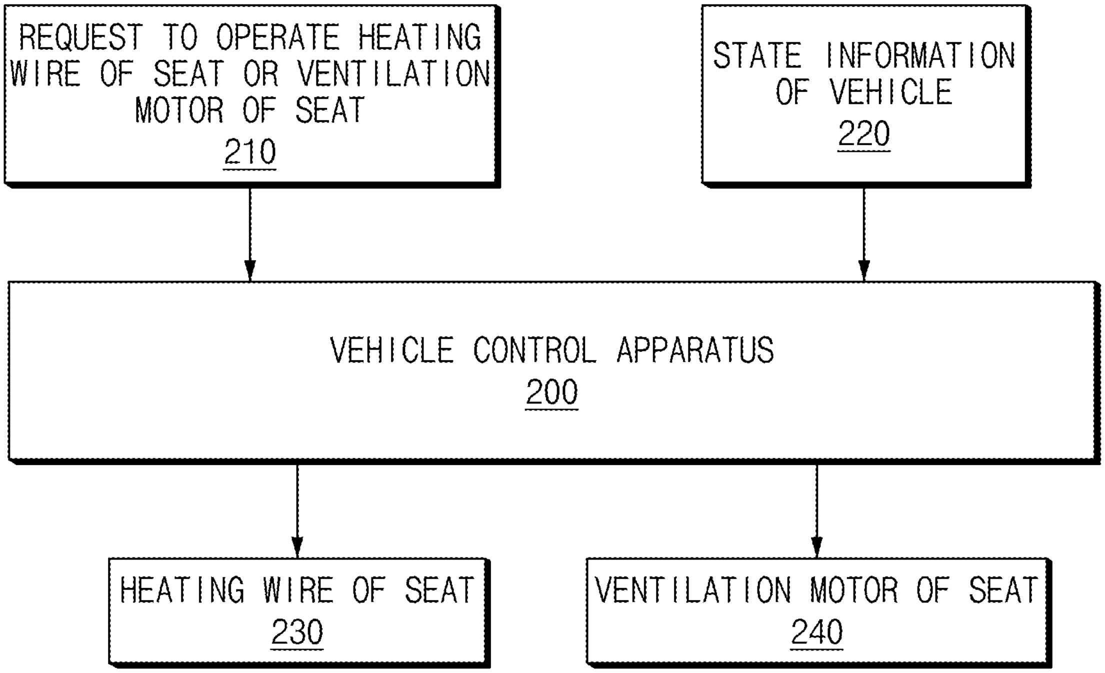
FIG. 2 is a block diagram illustrating an example of controlling a heating wire of a seat or a ventilation motor of the seat based on a request to operate the heating wire of the seat or the ventilation motor of the seat or state information of a vehicle in a vehicle control apparatus according to an example of the present disclosure.

FIG. 2 is a block diagram illustrating an example of controlling a heating wire of a seat or a ventilation motor of the seat based on a request to operate the heating wire of the seat or the ventilation motor of the seat or state information of a vehicle in a vehicle control apparatus according to an example of the present disclosure.

According to an example, a vehicle control apparatus 200 may receive a request 210 to operate the heating wire of the seat or the ventilation motor of the seat. For example, the vehicle control apparatus 200 may receive the request 210 to operate the heating wire of the seat or the ventilation motor of the seat, via an input of audio video navigation telematics (AVNT) of a vehicle, speech recognition using a microphone of the vehicle, an input using an application of a smartphone, a physical button provided in the vehicle, or the like.

According to an example, the vehicle control apparatus 200 may obtain state information 220 of the vehicle. For example, the state information 220 of the vehicle may include a start state of the vehicle, a remote control state of the vehicle, a charging state of a high voltage battery, a charging speed of the high voltage battery, a state of charge (SOC) of the high voltage battery, a charging state of a 12V battery, a charging speed of the 12V battery, a state of charge of the 12V battery, an ultra-wideband (UWB) signal associated with a position of a key fob or a digital key, an indoor temperature of the vehicle, an outdoor temperature of the vehicle, a state of health (SOH) of the battery, a location of the vehicle, weather information based on the location of the vehicle, or the like.

The vehicle control apparatus 200 may obtain the state information 220 of the vehicle by means of one or more sensors of the vehicle and may obtain the state information 220 of the vehicle from an external server. The one or more sensors may comprise, for example, a voltage sensor of the high voltage battery or low voltage battery, a RF sensor and/or UWB sensor, an internal temperature sensor, an external temperature sensor, a location sensor (e.g., GPS), etc.

According to an example, the vehicle control apparatus 200 may control a heating wire 230 of a seat. The vehicle control apparatus 200 may control a device which drives the heating wire 230. For example, the vehicle control apparatus 200 may adjust a temperature of the heating wire 230 of the seat. In detail, the vehicle control apparatus 200 may adjust the temperature of the heating wire 230 of the seat depending on one or more of a plurality of heating stages.

According to an example, the vehicle control apparatus 200 may control a ventilation motor 240 of the seat. The vehicle control apparatus 200 may control a device that drives the ventilation motor 240. For example, the vehicle control apparatus 200 may adjust a rotation speed of the ventilation motor 240 of the seat. In detail, the vehicle control apparatus 200 may adjust the rotation speed of the ventilation motor 240 of the seat depending on a plurality of cooling stages.

Hereinafter, a description will be given in detail of a vehicle control apparatus or a vehicle control method according to an example of the present disclosure with reference to FIGS. 3, 4, and 5.

Hereinafter, a vehicle control apparatus 100 of FIG. 1 performs a process of FIG. 3, 4, or 5. For convenience, FIGS. 3-5 are described by way of an example in which the steps are performed by a processor circuit. One, some, or all steps of the example methods of FIGS. 3-5, or portions thereof, may be performed by one or more other circuits. One or some, steps of the example methods of FIGS. 3-5 may be omitted, performed in other orders, and/or otherwise modified, and/or one or more additional steps may be added.

Hereinafter, a description will be given in detail of a vehicle control method according to an example of the present disclosure with reference to FIG. 3.

Figure 3:
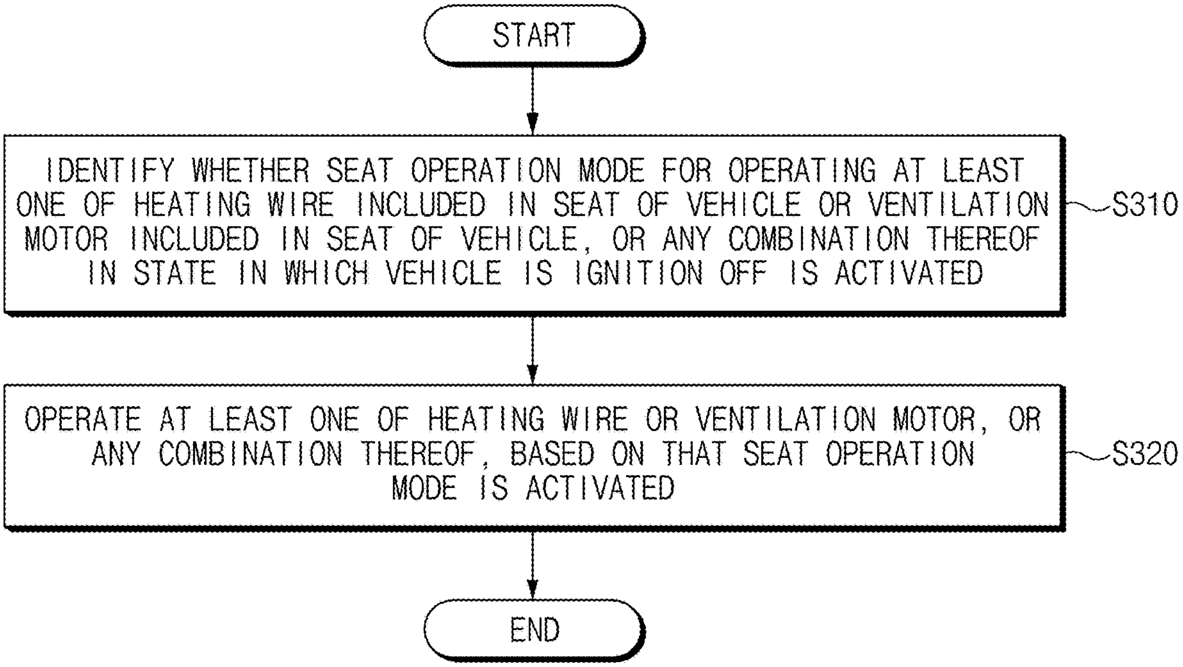
FIG. 3 is a flowchart for describing a vehicle control apparatus or a vehicle control method according to an example of the present disclosure.

FIG. 3 is a flowchart for describing a vehicle control apparatus or a vehicle control method according to an example of the present disclosure.

In S310, the vehicle control apparatus may identify whether a seat operation mode for operating at least one of a heating wire included in a seat of a vehicle or a ventilation motor included in the seat of the vehicle, or any combination thereof in a state in which the vehicle ignition is off is activated.

In S320, the vehicle control apparatus may operate the at least one of the heating wire or the ventilation motor, or the any combination thereof, based on that the seat operation mode is activated.

Figure 4:
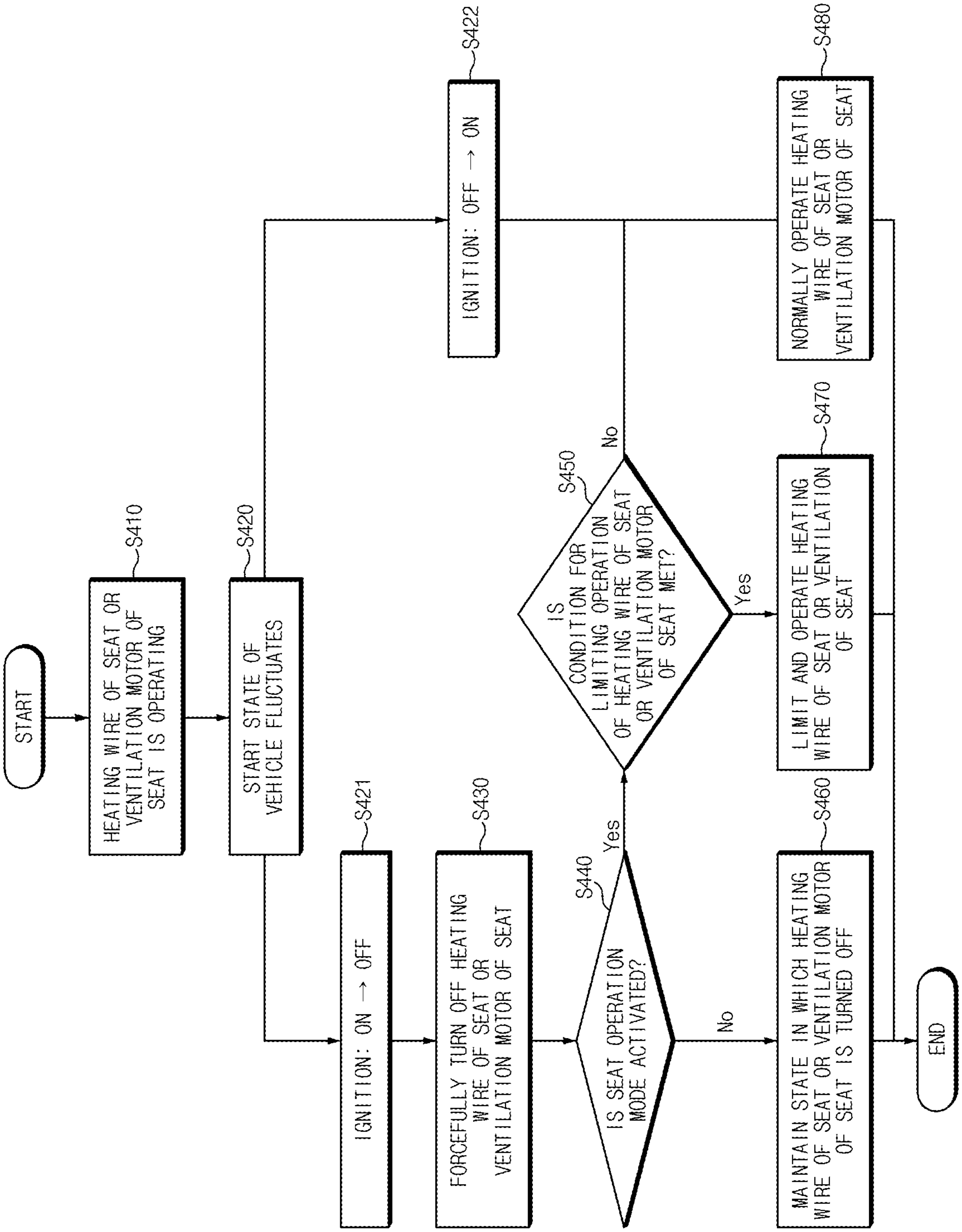
FIG. 4 is a flowchart for describing an example in which a heating wire of a seat or a ventilation motor of the seat operates according to a fluctuation in start state of a vehicle, by a vehicle control apparatus or a vehicle control method according to an example of the present disclosure.

FIG. 4 is a flowchart for describing an example in which a heating wire of a seat or a ventilation motor of the seat operates according to a fluctuation in start state of a vehicle, by a vehicle control apparatus or a vehicle control method according to an example of the present disclosure.

In S410, the vehicle control apparatus may identify whether a heating wire of a seat or a ventilation motor of the seat is operating.

In S420, the vehicle control apparatus may identify that a start state of the vehicle fluctuates. For example, the vehicle control apparatus may identify whether the vehicle ignition is off or the vehicle ignition is on.

In S421, the vehicle control apparatus may identify that the vehicle ignition is off in the state in which the vehicle ignition is on. If the vehicle ignition is off, in S430, the vehicle control apparatus may forcefully turn off the heating wire of the seat or the ventilation motor of the seat. At this time, the heating wire of the seat or the ventilation motor of the seat may be configured not to be forcefully turned off even if the vehicle ignition is off.

In S440, the vehicle control apparatus may determine whether a seat operation mode capable of operating the heating wire or the ventilation motor even in the state in which the vehicle ignition is off is activated.

For example, if a vehicle to load (V2L) function of the vehicle operates, an interior space use function determined that there is a user in the interior of the vehicle is executed, or one or more functions of the vehicle, which may indicate a need to operate the heating wire or the ventilation motor in the vehicle, is executed, the vehicle control apparatus may determine that the seat operation mode is activated.

If it is determined that the seat operation mode is not activated, in S460, the vehicle control apparatus may maintain a state in which the heating wire or the ventilation motor is turned off.

If it is determined that the seat operation mode is activated, in S450, the vehicle control apparatus may determine whether a condition for limiting an operation of the heating wire of the seat or the ventilation motor of the seat is met.

For example, the vehicle control apparatus may identify a speed at which a first battery is charged or a time taken for the first battery to be fully charged. If it is identified that the speed at which the first battery is charged is less than or equal to a threshold speed or the time taken for the first battery to be fully charged is greater than or equal to a threshold time, the vehicle control apparatus may determine that the condition for limiting the operation of the heating wire of the seat or the ventilation motor of the seat is met.

If it is determined that the condition for limiting the operation of the heating wire of the seat or the ventilation motor of the seat is met, in S470, the vehicle control apparatus may limit and operate the heating wire or the ventilation motor.

For example, the vehicle control apparatus may not operate the heating wire or the ventilation motor, may reduce a time over which the heating wire or the ventilation motor operates, or may reduce strength at which the heating wire or the ventilation motor operates.

If it is determined that the condition for limiting the operation of the heating wire of the seat or the ventilation motor of the seat is not met, in S480, the vehicle control apparatus may normally operate the heating wire or the ventilation motor. In this case, the heating wire or the ventilation motor may operate without limitation by a user or a system.

In S422, the vehicle control apparatus may identify that the vehicle ignition is on in the state in which the vehicle ignition is off. If the vehicle ignition is on, in S480, the vehicle control apparatus may normally operate the heating wire or the ventilation motor.

Figure 5:
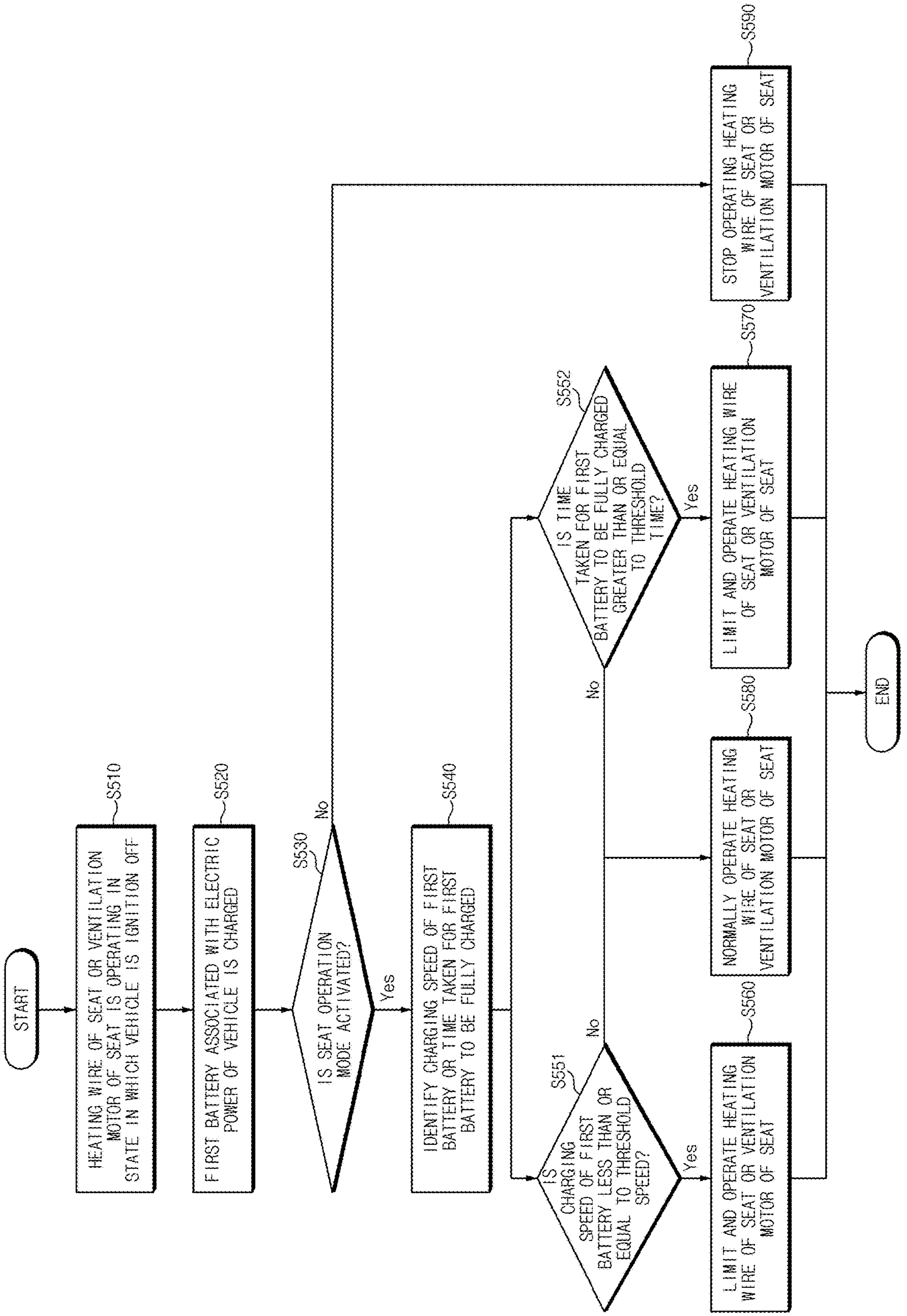
FIG. 5 is a flowchart for describing an example in which a heating wire of a seat or a ventilation motor of the seat is controlled according to a charging speed or a time taken for a first battery to be fully charged by a vehicle control apparatus or a vehicle control method according to an example of the present disclosure.

FIG. 5 is a flowchart for describing an example in which a heating wire of a seat or a ventilation motor of the seat is controlled according to a charging speed or a time taken for a first battery to be fully charged by a vehicle control apparatus or a vehicle control method according to an example of the present disclosure.

In S510, the vehicle control apparatus may identify that a heating wire of a seat or a ventilation motor of the seat is operating in a state in which a vehicle ignition is off. For example, the heating wire or the ventilation motor may be operating due to activation of a seat operation mode even in the state in which the vehicle ignition is off. For another example, the operation of the heating wire or the ventilation motor which is previously operating may not be stopped and the heating wire or the ventilation motor may continue operating, although the vehicle ignition is off, depending on a system setting.

In S520, the vehicle control apparatus may identify that a first battery associated with electric power of the vehicle is charged. For example, the first battery may include a high voltage battery.

In S530, the vehicle control apparatus may determine whether the seat operation mode capable of operating the heating wire or the ventilation motor even in the state in which the vehicle ignition is off is activated.

For example, if a vehicle to load (V2L) function of the vehicle operates, an interior space use function determined that there is a user in the interior of the vehicle is executed, or one or more other functions of the vehicle, which may indicate a need to operate the heating wire or the ventilation motor in the vehicle, is executed, the vehicle control apparatus may determine that the seat operation mode is activated.

If it is determined that the seat operation mode is not activated, in S590, the vehicle control apparatus may stop operating the heating wire of the seat or the ventilation motor of the seat.

If it is determined that the seat operation mode is activated, in S540, the vehicle control apparatus may identify a charging speed of the first battery or a time taken for the first battery to be fully charged.

In S551, the vehicle control apparatus may determine whether the charging speed of the first battery is less than or equal to a threshold speed. If it is determined that the speed at which the first battery is charged is less than or equal to the threshold speed, the vehicle control apparatus may determine that the first battery is charged at a low speed. The threshold speed may include a charging speed determined that the first battery is charged at the low speed.

If the charging speed of the first battery is not less than or equal to the threshold speed, in S580, the vehicle control apparatus may normally operate the heating wire of the seat or the ventilation motor of the seat. In this case, the heating wire or the ventilation motor may operate without limitation by a user or a system.

If the charging speed of the first battery is less than or equal to the threshold speed, in S560, the vehicle control apparatus may limit and operate the heating wire of the seat or the ventilation motor of the seat.

For example, the vehicle control apparatus may not operate the heating wire or the ventilation motor, may reduce a time over which the heating wire or the ventilation motor operates, or may reduce strength at which the heating wire or the ventilation motor operates.

In S552, the vehicle control apparatus may determine whether the time taken for the first battery to be fully charged is greater than or equal to a threshold time.

If it is determined that the time taken for the first battery to be fully charged is greater than or equal to the threshold time, in S570, the vehicle control apparatus may limit and operate the heating wire of the seat or the ventilation motor of the seat.

For example, the vehicle control apparatus may not operate the heating wire or the ventilation motor, may reduce a time over which the heating wire or the ventilation motor operates, or may reduce strength at which the heating wire or the ventilation motor operates.

If the time taken for the first battery to be fully charged is not greater than or equal to the threshold time, in S580, the vehicle control apparatus may normally operate the heating wire of the seat or the ventilation motor of the seat. In this case, the heating wire or the ventilation motor may operate without limitation by the user or the system.

Figure 6:
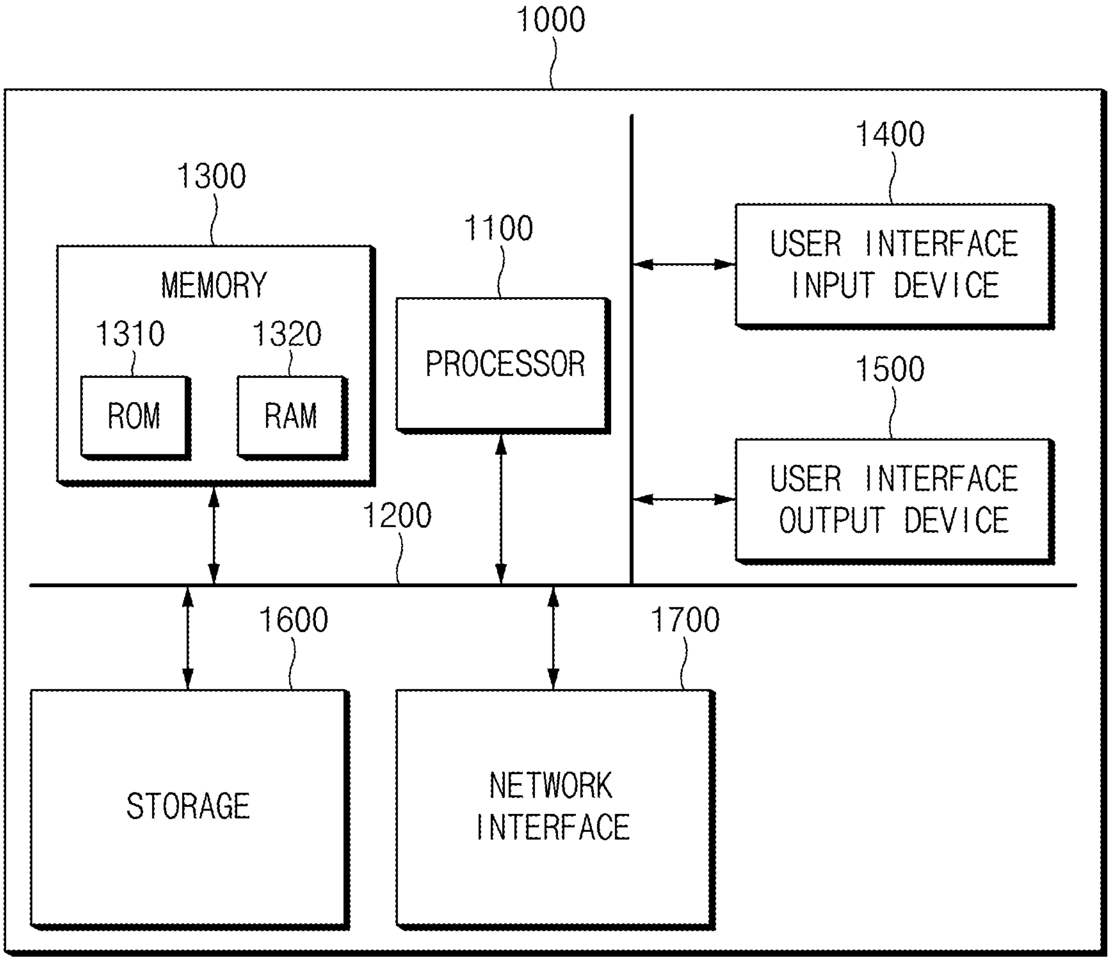
FIG. 6 is a drawing illustrating a computing system associated with a vehicle control apparatus or a vehicle control method according to an example of the present disclosure.

FIG. 6 is a drawing illustrating a computing system associated with a vehicle control apparatus or a vehicle control method according to an example of the present disclosure.

Referring to FIG. 6, a computing system 1000 may include at least one processor 1100, a memory 1300, a user interface input device 1400, a user interface output device 1500, a storage 1600, and/or a network interface 1700. The components of the computing system 1000 may be connected with each other via a bus 1200 and/or other means (e.g., wireless communications).

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the operations of the method or algorithm described in connection with the examples disclosed in the specification may be directly implemented with a hardware module, a software module, or a combination of the hardware module and the software module, which is executed by the processor 1100. The software module may reside on a storage medium (that is, the memory 1300 and/or the storage 1600) such as a RAM, a flash memory, a ROM, an EPROM, an EEPROM, a register, a hard disc, a removable disk, and a CD-ROM.

The exemplary storage medium may be coupled to the processor 1100. The processor 1100 may read out information from the storage medium and may write information in the storage medium. Also, or alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The present disclosure has been made to solve the above-mentioned problems occurring in the prior art while advantages achieved by the prior art are maintained intact.

An aspect of the present disclosure provides a vehicle control apparatus for operating a heating wire of a seat or a ventilation motor of the seat even in a state in which a vehicle ignition is off and a method thereof.

An aspect of the present disclosure provides a vehicle control apparatus for controlling a heating wire of a seat or a ventilation motor of the seat to operate in only a situation in which there is a need to operate the heating wire of the seat or the ventilation motor of the seat in a state in which a vehicle ignition is off to prevent unnecessary power consumption and a method thereof.

An aspect of the present disclosure provides a vehicle control apparatus for controlling a heating wire of a seat or a ventilation motor of a seat based on a state in which the battery of a vehicle is charged to prevent the battery from being discharged although operating the heating wire of the seat or the ventilation motor of the seat in a state in which the vehicle ignition is off and a method thereof.

An aspect of the present disclosure provides a vehicle control apparatus for providing a notification by means of a display or an audio of a vehicle, if limiting and operating a heating wire of a seat or a ventilation motor of a seat based on a state in which the battery of a vehicle is charged to allow a user who stays in the interior of the vehicle to additionally control the heating wire of the seat or the ventilation motor of the seat if necessary and a method thereof.

The technical problems to be solved by the present disclosure are not limited to the aforementioned problems, and any other technical problems not mentioned herein will be clearly understood from the following description by those skilled in the art to which the present disclosure pertains.

A vehicle control apparatus may include a memory storing a program instruction in conjunction with a seat of a vehicle, the seat including at least one of a heating wire or a ventilation motor, or any combination and a processor that executes the program instruction. The processor may identify whether a seat operation mode for operating the at least one of the heating wire or the ventilation motor, or the any combination thereof in a state in which the vehicle ignition is off is activated and may operate the at least one of the heating wire or the ventilation motor, or the any combination thereof, based on that the seat operation mode is activated.

In an example, the processor may activate the seat operation mode, based on that a vehicle to load (V2L) function of the vehicle operates, an interior space use function determined that there is a user in the interior of the vehicle is executed, or a function of the vehicle, the function being required to operate the heating wire or the ventilation motor in the vehicle, is executed.

In an example, the processor may activate the seat operation mode, based on at least one of a state in which a first battery associated with electric power of the vehicle is charged, a state in which a second battery associated with the heating wire or the ventilation motor is charged using the first battery, a state in which the vehicle remotely receives a control command, or a state in which the vehicle is being remotely controlled, or any combination thereof.

In an example, the processor may fail to activate the seat operation mode, based on that a second battery associated with the heating wire or the ventilation motor is charged as a state of charge (SOC) of the second battery meets an SOC condition for requiring charging.

In an example, the processor may identify at least one of a speed at which a first battery associated with electric power of the vehicle is charged or a time taken for the first battery to be fully charged, or any combination thereof, based on that the seat operation mode is activated in a state in which the first battery is charged, and may control the heating wire or the ventilation motor, based on the at least one of the speed at which the first battery is charged or the time taken for the first battery to be fully charged, or the any combination thereof.

In an example, based on that it is identified that the speed at which the first battery is charged is less than or equal to a threshold speed, the processor may fail to operate the heating wire or the ventilation motor, may reduce a time when the heating wire or the ventilation motor operates, or may reduce strength at which the heating wire or the ventilation motor operates.

In an example, based on that it is identified that the time taken for the first battery to be fully charged is greater than or equal to a threshold time, the processor may fail to operate the heating wire or the ventilation motor, may reduce a time when the heating wire or the ventilation motor operates, or may reduce strength at which the heating wire or the ventilation motor operates.

In an example, the processor may identify environmental information including at least one of an indoor temperature of the vehicle, an outdoor temperature of the vehicle, or weather of a place where the vehicle is located, or any combination thereof and may control the heating wire or the ventilation motor depending on the environmental information, based on that the seat operation mode is activated in a state in which it is identified that a speed at which a first battery associated with electric power of the vehicle is charged is less than or equal to a threshold speed.

In an example, the processor may identify a position of a key of the vehicle and may stop operating the heating wire or the ventilation motor depending on that the seat operation mode is activated, based on the position of the key.

In an example, the processor may provide a notification of stopping operating the heating wire or the ventilation motor, using at least one of a display of the vehicle or an audio of the vehicle, or any combination thereof, based on that operating the heating wire or the ventilation motor is stopped.

In an example, the processor may forcefully stop operating the heating wire and/or the ventilation motor, based on that the vehicle ignition is off and/or may operate the at least one of the heating wire and/or the ventilation motor, or any combination thereof again, based on that the seat operation mode is activated.

According to another aspect of the present disclosure, a vehicle control method may include identifying, by a processor, whether a seat operation mode for operating at least one of a heating wire included in a seat of a vehicle or a ventilation motor included in the seat of the vehicle, or any combination thereof in a state in which the vehicle ignition is off is activated and operating, by the processor, the at least one of the heating wire or the ventilation motor, or the any combination thereof, based on that the seat operation mode is activated.

The vehicle control method, according to an example may further include activating, by the processor, the seat operation mode, based on that a vehicle to load (V2L) function of the vehicle operates, an interior space use function determined that there is a user in the interior of the vehicle is executed, or a function of the vehicle, the function being required to operate the heating wire or the ventilation motor in the vehicle, is executed.

The vehicle control method, according to an example may further include activating, by the processor, the seat operation mode, based on at least one of a state in which a first battery associated with electric power of the vehicle is charged, a state in which a second battery associated with the heating wire or the ventilation motor is charged using the first battery, a state in which the vehicle remotely receives a control command, or a state in which the vehicle is being remotely controlled, or any combination thereof.

The vehicle control method, according to an example may further include failing to activate the seat operation mode, based on that a second battery associated with the heating wire or the ventilation motor is charged as a state of charge (SOC) of the second battery meets an SOC condition for requiring charging.

In the vehicle control method, according to an example, the operating of the at least one of the heating wire or the ventilation motor, or the any combination thereof, based on that the seat operation mode is activated, by the processor may include identifying, by the processor, at least one of a speed at which a first battery associated with electric power of the vehicle is charged or a time taken for the first battery to be fully charged, or any combination thereof, based on that the seat operation mode is activated in a state in which the first battery is charged, and controlling, by the processor, the heating wire or the ventilation motor, based on the at least one of the speed at which the first battery is charged or the time taken for the first battery to be fully charged, or the any combination thereof.

In the vehicle control method, according to an example, the controlling of the heating wire or the ventilation motor, based on the at least one of the speed at which the first battery is charged or the time taken for the first battery to be fully charged, or the any combination thereof, by the processor may include failing, by the processor, to operate the heating wire or the ventilation motor, based on that it is identified that the speed at which the first battery is charged is less than or equal to a threshold speed, reducing, by the processor, a time when the heating wire or the ventilation motor operates, based on that it is identified that the speed at which the first battery is charged is less than or equal to the threshold speed, or reducing, by the processor, strength at which the heating wire or the ventilation motor operates, based on that it is identified that the speed at which the first battery is charged is less than or equal to the threshold speed.

In the vehicle control method, according to an example, the controlling of the heating wire or the ventilation motor, based on the at least one of the speed at which the first battery is charged or the time taken for the first battery to be fully charged, or the any combination thereof, by the processor may include failing, by the processor, to operate the heating wire or the ventilation motor, based on that it is identified that the time taken for the first battery to be fully charged is greater than or equal to a threshold time, reducing, by the processor, a time when the heating wire or the ventilation motor operates, based on that it is identified that the time taken for the first battery to be fully charged is greater than or equal to the threshold time, or reducing, by the processor, strength at which the heating wire or the ventilation motor operates, based on that it is identified that the time taken for the first battery to be fully charged is greater than or equal to the threshold time.

The vehicle control method may further include identifying, by the processor, environmental information including at least one of an indoor temperature of the vehicle, an outdoor temperature of the vehicle, or weather of a place where the vehicle is located, or any combination thereof. The operating of the at least one of the heating wire or the ventilation motor, or the any combination thereof, based on that the seat operation mode is activated, by the processor may include controlling, by the processor, the heating wire or the ventilation motor depending on the environmental information, based on that the seat operation mode is activated in a state in which it is identified that a speed at which a first battery associated with electric power of the vehicle is charged is less than or equal to a threshold speed.

The present technology may operate a heating wire of a seat and/or a ventilation motor of the seat even in a state in which a vehicle ignition is off.

Furthermore, the present technology may control the heating wire of the seat or the ventilation motor of the seat to operate in only a situation in which there is a need to operate the heating wire of the seat or the ventilation motor of the seat in the state in which the vehicle ignition is off, thus preventing unnecessary power consumption.

Furthermore, the present technology may control the heating wire of the seat or the ventilation motor of the seat based on a state in which the battery of the vehicle is charged, thus preventing the battery from being discharged although operating the heating wire of the seat or the ventilation motor of the seat in the state in which the vehicle ignition is off.

Furthermore, the present technology may provide a notification by means of a display or an audio output device of the vehicle, if limiting and operating the heating wire of the seat or the ventilation motor of the seat based on the state in which the battery of the vehicle is being charged, thus allowing a user who stays in the interior of the vehicle to additionally control the heating wire of the seat or the ventilation motor of the seat if necessary.

In addition, various effects ascertained directly or indirectly through the present disclosure may be provided.

Hereinabove, although the present disclosure has been described with reference to exemplary examples and the accompanying drawings, the present disclosure is not limited thereto, but may be variously modified and altered by those skilled in the art to which the present disclosure pertains without departing from the spirit and scope of the present disclosure claimed in the following claims.

Therefore, examples of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. A vehicle control apparatus, comprising:

a memory storing one or more instructions associated with a seat, of a vehicle, comprising at least one of a heating wire or a ventilation motor; and a processor configured to execute the one or more instructions, wherein the processor is configured to:
determine that a seat operation mode, for operating the at least one of the heating wire or the ventilation motor, is activated in a state in which an ignition of the vehicle is turned off; and
operate, based on the seat operation mode being activated in the state in which the ignition is turned off, the at least one of the heating wire or the ventilation motor.

2. The vehicle control apparatus of claim 1, wherein the processor is further configured to:
activate the seat operation mode based on at least one of:
a determination that a vehicle to load (V2L) function of the vehicle is operating;
detecting execution of an interior space use function indicating that there is a user in an interior of the vehicle; or
detecting execution of one or more additional functions, of the vehicle, indicating a need to operate the heating wire or the ventilation motor.

3. The vehicle control apparatus of claim 1, wherein the processor is further configured to:
activate the seat operation mode based on at least one of:
a state in which a first battery associated with electric power of the vehicle is being charged,
a state in which a second battery associated with the heating wire or the ventilation motor is being charged via the first battery,
a state in which the vehicle receives a remote control command, or
a state in which the vehicle is being remotely controlled, or any combination thereof.

4. The vehicle control apparatus of claim 1, wherein the processor is further configured to:
based on a second battery associated with the heating wire or the ventilation motor being charged in response to a state of charge (SOC) of the second battery meets an SOC condition for requiring charging, deactivate the seat operation mode or maintain a deactivated state of the seat operation mode.

5. The vehicle control apparatus of claim 1, wherein the processor is further configured to:
identify, based on the seat operation mode being activated in a state in which a first battery is being charged, at least one of:
a speed at which the first battery associated with electric power of the vehicle is being charged, or
a time taken for the first battery to be fully charged; and
control, based on the at least one of the speed or the time, at least one of the heating wire or the ventilation motor.

6. The vehicle control apparatus of claim 5, wherein the processor is further configured to:
based on the identified speed being less than or equal to a threshold speed, perform at least one of:
determine not to operate the heating wire or the ventilation motor;
reduce a time over which the heating wire or the ventilation motor operates; or
reduce a strength at which the heating wire or the ventilation motor operates.

7. The vehicle control apparatus of claim 5, wherein the processor is further configured to:
based on the identified time being greater than or equal to a threshold time, perform at least one of:
determine not to operate the heating wire or the ventilation motor;
reduce a time over which the heating wire or the ventilation motor operates; or
reduce strength at which the heating wire or the ventilation motor operates.

8. The vehicle control apparatus of claim 1, wherein the processor is further configured to:
determine environmental information comprising at least one of:
an indoor temperature of the vehicle,
an outdoor temperature of the vehicle, or
weather of a place where the vehicle is located, or any combination thereof; and
based on the seat operation mode being activated and a speed at which a first battery associated with electric power of the vehicle is charged being less than or equal to a threshold speed, control the heating wire or the ventilation motor according to the environmental information.

9. The vehicle control apparatus of claim 1, wherein the processor is further configured to:
identify a position of a key of the vehicle; and
based on the position of the key, stop operation of the heating wire or the ventilation motor.

10. The vehicle control apparatus of claim 9, wherein the processor is further configured to:
output, via a display of the vehicle or an audio output device of the vehicle, a notification indicating the stopped operation of the heating wire or the ventilation motor.

11. The vehicle control apparatus of claim 1, wherein the processor is further configured to:
based on the ignition being turned off, stop operation of the heating wire or the ventilation motor; and
restarting, based on the seat operation mode being activated, operation of the at least one of the heating wire or the ventilation motor.

12. A vehicle control method, comprising:
identifying, by a processor of a vehicle, whether a seat operation mode, for operating at least one of a heating wire included in a seat of the vehicle or a ventilation motor included in the seat of the vehicle, is activated while an ignition of the vehicle is turned off; and
operating, based on the seat operation mode being activated and by the processor, the at least one of the heating wire or the ventilation motor.

13. The vehicle control method of claim 12, further comprising:
activating, by the processor, the seat operation mode based on at least one of:
a determination that a vehicle to load (V2L) function of the vehicle is operating,
detecting execution of an interior space use function indicating that there is a user in an interior of the vehicle, or
detecting execution of one or more additional functions, of the vehicle, indicating a need to operate the heating wire or the ventilation motor.

14. The vehicle control method of claim 12, further comprising:
activating, by the processor, the seat operation mode based on at least one of:
a state in which a first battery associated with electric power of the vehicle is being charged,
a state in which a second battery associated with the heating wire or the ventilation motor is being charged via the first battery, a state in which the vehicle receives a remote control command, or a state in which the vehicle is being remotely controlled, or any combination thereof.

15. The vehicle control method of claim 12, further comprising:

based on a second battery associated with the heating wire or the ventilation motor being charged in response to a state of charge (SOC) of the second battery meets an SOC condition for requiring charging:

deactivating the seat operation mode, or maintaining a deactivated state of the seat operation mode.

16. The vehicle control method of claim 12, wherein the operating of the at least one of the heating wire or the ventilation motor comprises:

identifying, by the processor and based on the seat operation mode being activated in a state in which a first battery is being charged, at least one of:

a speed at which the first battery associated with electric power of the vehicle is being charged, or a time taken for the first battery to be fully charged; and controlling, by the processor based on the at least one of the speed of the time, at least one of the heating wire or the ventilation motor.

17. The vehicle control method of claim 16, wherein the controlling the at least one of the heating wire or the ventilation motor comprises performing, based on the identified speed being less than or equal to a threshold speed, at least one of:

determining, by the processor, to not operate the heating wire or the ventilation motor;

reducing, by the processor, a time over which the heating wire or the ventilation motor operates; or reducing, by the processor, a strength at which the heating wire or the ventilation motor operates.

18. The vehicle control method of claim 16, wherein the controlling the at least one of the heating wire or the ventilation motor comprises performing, based on the identified time being greater than or equal to a threshold time, at least one of:

determining, by the processor, to not operate the heating wire or the ventilation motor;

reducing, by the processor, a time over which the heating wire or the ventilation motor operates; or reducing, by the processor, a strength at which the heating wire or the ventilation motor operates.

19. The vehicle control method of claim 12, further comprising:

determining, by the processor, environmental information comprising at least one of:

an indoor temperature of the vehicle, an outdoor temperature of the vehicle, or weather of a place where the vehicle is located, or any combination thereof;

wherein the operating of the at least one of the heating wire or the ventilation motor based on that the seat operation mode being activated comprises:

based on the seat operation mode being activated and a speed at which a first battery associated with electric power of the vehicle is charged being less than or equal to a threshold speed, controlling, by the processor, the heating wire or the ventilation motor according to the environmental information.

20. A vehicle comprising:

a seat comprising at least one of a heating wire or a ventilation motor;

a processor configured to control operation of the at least one of the heating wire or the ventilation motor; and a memory storing one or more instructions that, when executed, cause the processor to:

determine that an ignition of the vehicle is off and that a seat operation mode, for operating the at least one of the heating wire or the ventilation motor, is activated; and operate, based on that the seat operation mode being activated, the at least one of the heating wire or the ventilation motor.

* * * * *